United States Patent
Matsuura (10) Patent No.: US 7,577,289 B2
(45) Date of Patent: Aug. 18, 2009

(54) COLOR PROCESSING APPARATUS AND METHOD

(75) Inventor: Takahiro Matsuura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 11/276,689

(22) Filed: Mar. 10, 2006

(65) Prior Publication Data

US 2006/0204084 A1  Sep. 14, 2006

(30) Foreign Application Priority Data

Mar. 14, 2005  (JP)  ............................. 2005-071738

(51) Int. Cl.
*G06K 9/00* (2006.01)
(52) U.S. Cl. .................. 382/162; 382/165; 382/167
(58) Field of Classification Search ................ 382/162, 382/165, 167
See application file for complete search history.

(56) References Cited

U.S. PATENT DOCUMENTS

| | | | |
|---|---|---|---|
| 6,278,533 B1 | 8/2001 | Takemoto | 358/521 |
| 6,453,066 B1 * | 9/2002 | Shiraiwa et al. | 382/162 |
| 7,013,042 B1 | 3/2006 | Yamada et al. | 382/167 |
| 7,262,779 B1 * | 8/2007 | Sones | 345/589 |
| 2003/0164828 A1 | 9/2003 | Hung | 345/426 |
| 2006/0093211 A1 | 5/2006 | Matsuura | 382/162 |
| 2007/0058223 A1 | 3/2007 | Matsuura | 358/518 |

FOREIGN PATENT DOCUMENTS

| | | |
|---|---|---|
| JP | 06-296284 | 10/1994 |
| JP | 10-164381 | 6/1999 |
| JP | 2002-281328 | 9/2002 |
| JP | 2003-102031 | 4/2003 |
| JP | 2003-179939 | 6/2003 |
| JP | 2004-341923 A | 12/2004 |

* cited by examiner

*Primary Examiner*—Phuoc Tran
(74) *Attorney, Agent, or Firm*—Fitzpatrick, Cella, Harper & Scinto (57) ABSTRACT

Color data which is obtained by capturing an image of a color chart by an image capturing apparatus under a first light source, and depends on the first light source is acquired. Target data which is based on colorimetry data of the color chart under a second light source, and depends on the second light source is acquired. The target data which depends on the second light source is converted into target data which depends on the first light source. A color processing parameter corresponding to the first light source is generated based on the color data which depends on the first light source and the target data which depends on the first light source.

11 Claims, 5 Drawing Sheets

COLOR PROCESSING APPARATUS AND METHOD

FIELD OF THE INVENTION

The present invention relates to processing for generating color processing parameters according to a light source upon capturing an image.

BACKGROUND OF THE INVENTION

A digital camera holds a plurality of image processing parameters in advance, and performs image processing such as color processing or the like of a captured image using an image processing parameter according to a mode selected by the user. In other words, the image processing of the digital camera corresponding to each of modes prepared in advance can only be set, and color reproduction or the like of user's favor cannot be realized.

Japanese Patent Laid-Open No. 2004-341923 discloses a technique for obtaining optimal image processing parameters which can convert captured image data obtained when a color chart including a skin color, sky color, grass color, primary colors, and the like is captured by a digital camera to be close to original colors of that color chart or favorable colors of the user.

Note that the favorable colors of the user include, e.g., a skin color, sky color, grass color, primary colors, and the like. Also, the original colors of the color chart or the favorable colors of the user will be referred to as "target data" hereinafter.

In the above technique, the color temperature of a light source upon capturing an image must match that of a light source upon measuring target data. If the color temperatures of the light source are different between these cases, the target data must be measured again at the color temperature of the light source upon capturing an image.

SUMMARY OF THE INVENTION

It is an object of the present invention to generate color processing parameters according to the light source upon capturing an image without measuring target data again.

According to the present invention, the foregoing object is attained by providing a color processing method comprising:

acquiring color data which is obtained by capturing an image of a color chart by an image capturing apparatus under a first light source, and depends on the first light source;

acquiring target data which is based on colorimetry data of the color chart under a second light source, and depends on the second light source;

converting the target data which depends on the second light source into target data which depends on the first light source; and generating a color processing parameter corresponding to the first light source based on the color data which depends on the first light source and the target data which depends on the first light source.

In a preferred embodiment, the apparatus further comprises:

adjusting the target data which depends on the second light source in accordance with a user's instruction.

In a preferred embodiment, the apparatus further comprises:

setting a conversion condition used in the conversion based on first light source information corresponding to the first light source and second light source information corresponding to the second light source.

In a preferred embodiment, the conversion condition is the Bradford conversion formula.

In a preferred embodiment, the apparatus further comprises:

setting the first light source information or/and the second light source information based on a user's manual instruction.

In a preferred embodiment, the first light source information is acquired upon capturing the image of the color chart by the image capturing apparatus under the first light source.

In a preferred embodiment, the apparatus further comprises:

acquiring color data which is obtained by capturing an image of the color chart by an image capturing apparatus under a third light source, and depends on the third light source;

managing the generated color processing parameter in association with first light source information corresponding to the first light source; and applying, when light source information corresponding to the third light source is equal to the managed first light source information, color processing to the color data which depends on the third light source using the managed color processing parameter.

In a preferred embodiment, the generating the color processing parameter includes optimizing a parameter based on a color difference between color data obtained by converting the color data which depends on the first light source using a predetermined color processing parameter, and the target data which depends on the first light source.

In a preferred embodiment, the apparatus further comprises:

generating a lookup table based on the generated color processing parameter; and applying color processing to the color data which depends on the first light source using the lookup table.

According to the present invention, the foregoing object is attained by providing a program for making a computer execute color processing, the program characterized by making the computer execute:

acquiring color data which is obtained by capturing an image of a color chart by an image capturing apparatus under a first light source, and depends on the first light source;

acquiring target data which is based on colorimetry data of the color chart under a second light source, and depends on the second light source;

converting the target data which depends on the second light source into target data which depends on the first light source; and generating a color processing parameter corresponding to the first light source based on the color data which depends on the first light source and the target data which depends on the first light source.

According to the present invention, the foregoing object is attained by providing a color processing apparatus comprising:

first acquisition means for acquiring color data which is obtained by capturing an image of a color chart by an image capturing apparatus under a first light source, and depends on the first light source;

second acquisition means for acquiring target data which is based on colorimetry data of the color chart under a second light source, and depends on the second light source;

conversion means for converting the target data which depends on the second light source into target data which depends on the first light source; and generation means for generating a color processing parameter corresponding to the first light source based on the color data which depends on the first light source and the target data which depends on the first light source.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
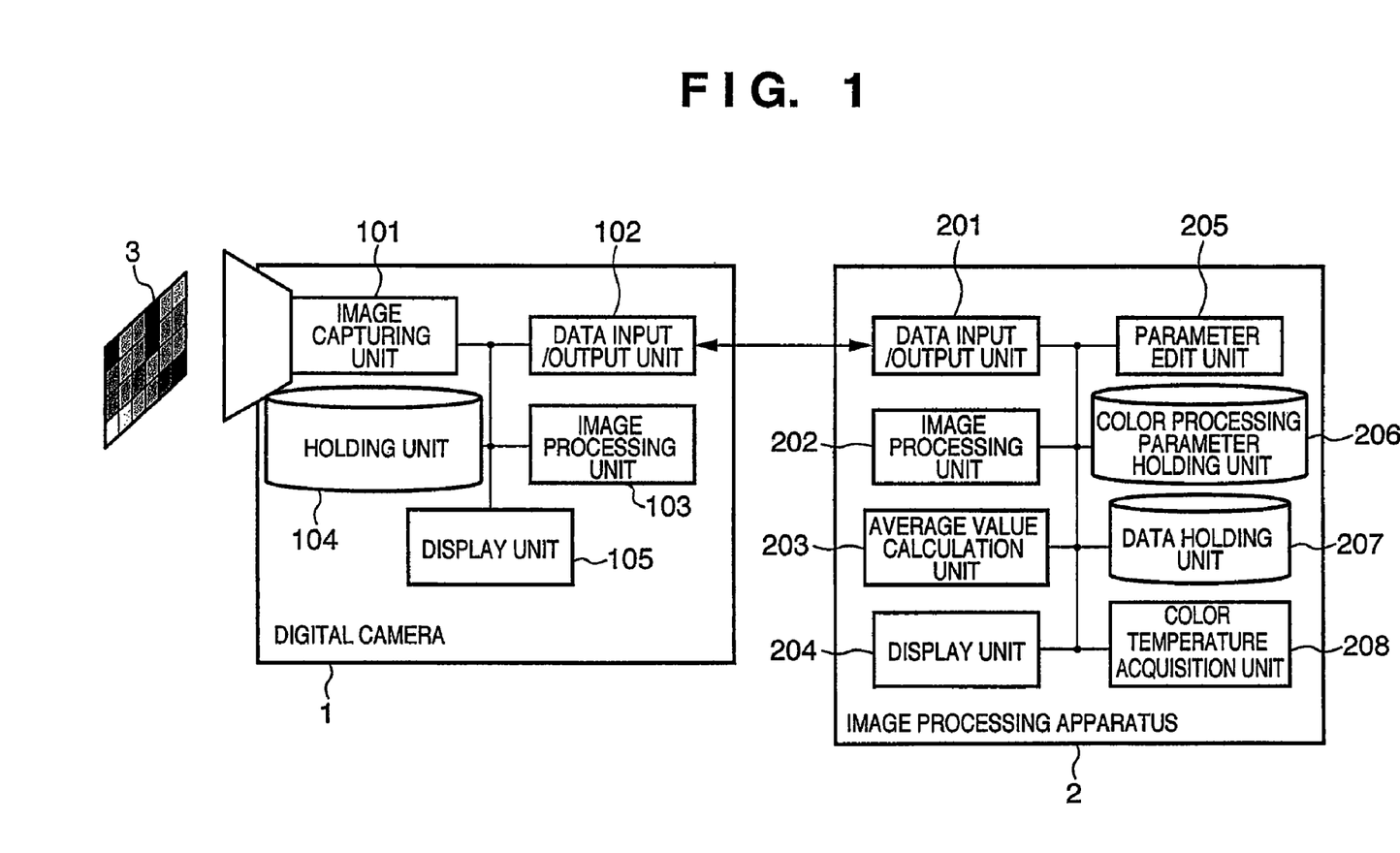
FIG. 1 is a block diagram showing an example of the arrangement of a system.

FIG. 1 is a block diagram showing an example of the arrangement of a system according to the first embodiment. The system has a digital camera 1, an image processing apparatus 2 for customizing color correction parameters, and a color chart 3.

The digital camera 1 has an image capturing unit 101 that includes an image capturing lens and an image sensor such as a CCD or the like, a data input/output unit 102 which interfaces data such as image data, color processing parameters, and the like with an external device, and an image processing unit 103 which applies image processing to an object image captured by the image capturing unit 101. The digital camera 1 has a holding unit 104 which holds data such as image data of an object image, that after image processing, color processing parameters, and the like, and a display unit 105 such as a liquid crystal display or the like which displays an image during or after image capturing, an image after color processing, or the like. Note that the image processing unit 103 performs image processing using color processing parameters stored in the holding unit 104. To the data input/output unit 102, the image processing apparatus 2 can be connected via a cable or the like, or a recording medium such as a memory card or the like can be connected.

The image processing apparatus 2 has a data input/output unit 201 which interfaces data such as image data, color processing parameters, target data, and the like with an external device. The image processing apparatus 2 has an image processing unit 202 which applies image processing to input image data, and an average value calculation unit 203 which calculates an RGB average value of a patch expressed by input image data. The image processing apparatus 2 has a display unit 204 which displays an image obtained by plotting input image data and target data on an a*b* plane of a color space specified by CIELAB, and a user interface (to be described later) used to acquire a color temperature. The image processing apparatus 2 has a parameter edit unit 205 which edits color processing parameters using, e.g., a DLS method (to be described later) or the like, and a color processing parameter holding unit 206 which holds color processing parameters of the digital camera 1. The image processing apparatus 2 has a data holding unit 207 which holds data such as input image data, image data after image processing, target data, and the like, and a color temperature selection unit 208 which is used to select the color temperature of a light source upon capturing an image.

Note that the image processing unit 202 performs image processing using color processing parameters stored in the color processing parameter holding unit 206. To the data input/output unit 201, an image capturing device such as the digital camera 1 or the like can be connected via a cable or the like, or a recording medium such as a memory card or the like can be connected. Note that the data holding unit 207 also serves as a work memory for processing to be described later.

[Processing of Digital Camera]

Upon capturing an object image, when the user turns on a power switch (not shown), the image capturing unit 101 begins to capture image data. The image processing unit 103 applies image processing to image data, which is intermittently input from the image capturing unit 101, using a three-dimensional lookup table (3DLUT) (a 3DLUT generated based on color processing parameters to be described later) stored in the holding unit 104. The image processing unit 103 generates a display image based on the image data that has undergone the image processing, and displays it on the display unit 105. The display unit 105 intermittently displays an image.

The user determines the composition of a frame by observing the image displayed on the display unit 105, and presses a shutter button (not shown) to capture an image. Upon pressing of the shutter button, the image processing unit 103 applies image processing (processes of colors, brightness, and the like) based on the 3DLUT stored in the holding unit 104 to image data captured by the image capturing unit 101 at the pressing timing of the shutter button. The image data that has undergone the image processing is output to an external device (the image processing apparatus 2, storage medium, or the like) via the data input/output unit 102.

If the color processing parameters are set in the holding unit 104 to output image data acquired by the image capturing unit 101 intact to the data input/output unit 102 upon image capture, the image data itself captured by the image capturing unit 101 is output from the digital camera 1.

[Color Chart]

Figure 2:
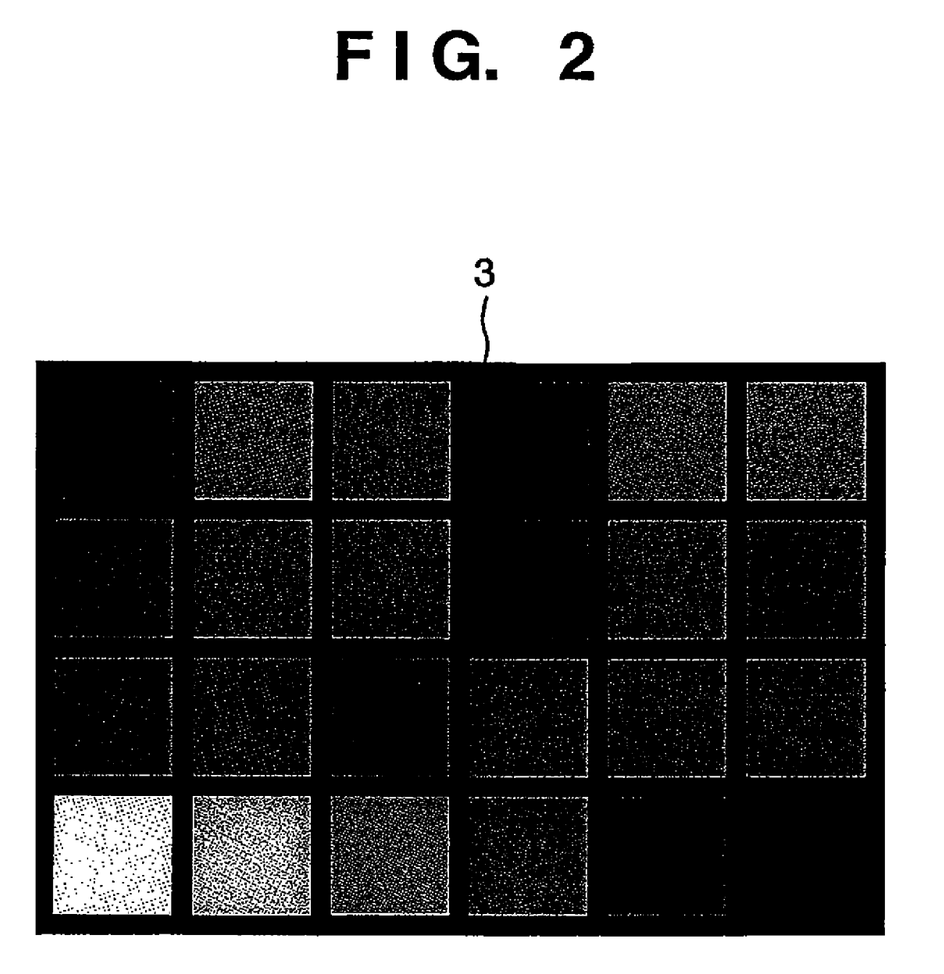
FIG. 2 shows an example of a color chart.

FIG. 2 shows an example of the color chart 3. As the color chart, for example, color charts such as ColorChecker for DC (240 colors), ColorChecker (24 colors), and the like available from GretagMacbeth AG, which can be used in color design can be used. Color charts may be changed for different purposes.

[Processing of Image Processing Apparatus]

Figure 5:
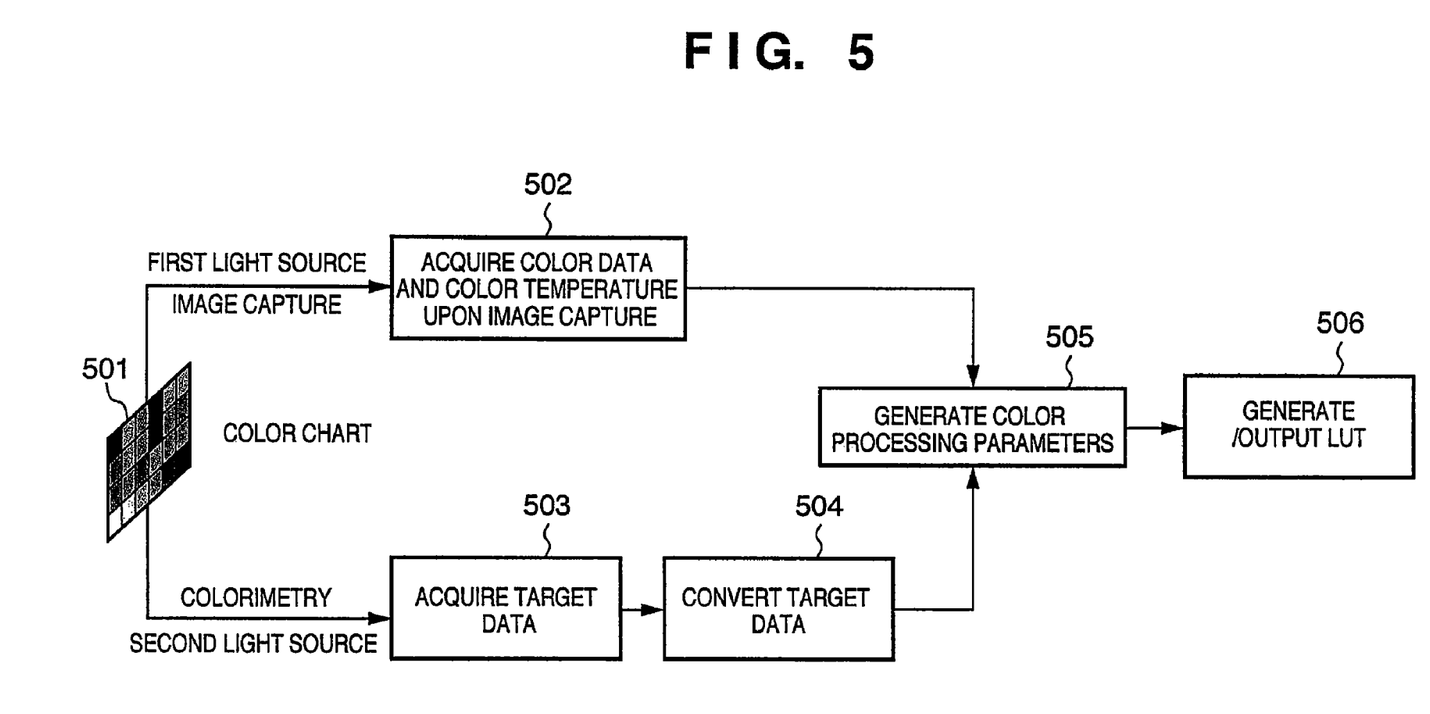
FIG. 5 is a diagram showing an overview of the processing of the image processing apparatus.

FIG. 5 is a diagram showing an overview of the processing of the image processing apparatus.

Reference numeral 501 denotes a color chart. Reference numeral 502 denotes a processing step of acquiring color data and the color temperature upon capturing an image. Reference numeral 503 denotes a step of acquiring target data. Reference numeral 504 denotes a step of converting the target data. Reference numeral 505 denotes a step of generating color processing parameters. Reference numeral 506 denotes a processing step of generating and outputting an LUT.

The following explanation will be given by associating the processes shown in FIGS. 3 and 5 which show the flow of the processing for optimizing the color processing parameters to be described later.

In step 502, an image of the color chart 501 is captured under a first light source to acquire color data of respective patches and the color temperature of the first light source. Step 502 corresponds to S1 to S4 in FIG. 3. In step 503, target data which are obtained by measuring the color chart 501 under a second light source are acquired. Step 503 corresponds to S5 in FIG. 3. In step 504, the target data which are acquired in step 503 and depend on a second color temperature are converted into target data depending on a first color temperature. Step 504 corresponds to S6 in FIG. 3. Since the target data are converted in step 504, the color chart need not be measured again under the first color temperature. In step 505, color processing parameters corresponding to the first color temperature are generated based on the color data acquired in step 502 and the target data converted in step 504. Step 505 corresponds to S7 in FIG. 3. In step 506, a conversion LUT is generated using the color processing parameters generated in step 505, and the generated LUT is output. Step 506 corresponds to S8 and S9 in FIG. 3.

Figure 3:
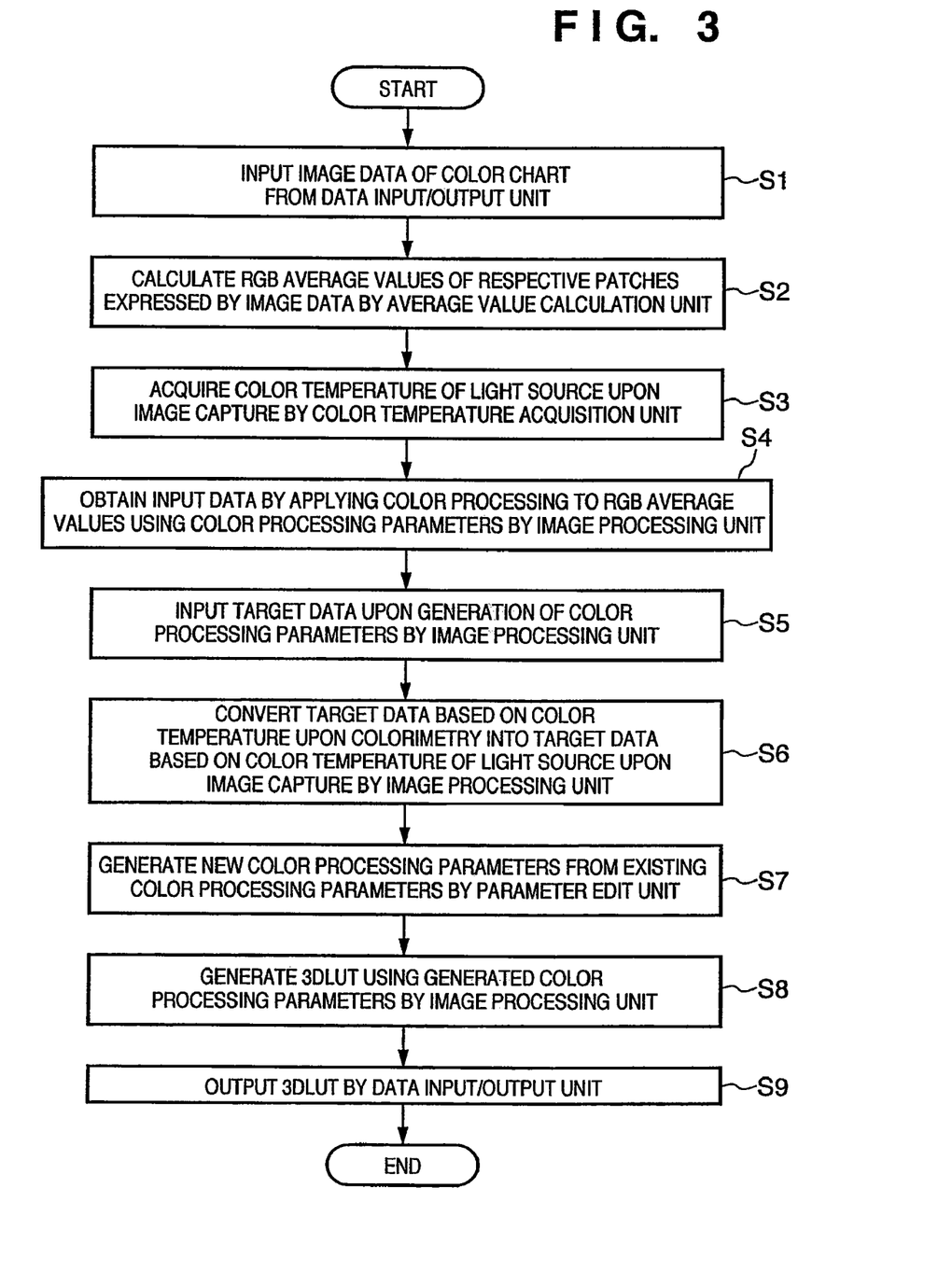
FIG. 3 is a flowchart showing the flow of processing in an image processing apparatus.

FIG. 3 is a flowchart for explaining details of the processing for optimizing the color processing parameters in the image processing apparatus 2.

The data input/output unit 201 reads image data obtained by capturing an image of the color chart 3 by the digital camera 1 under a uniform illumination (S1). The image data may be read directly from the digital camera 1 via a cable or the like, or may be read via a recording medium such as a memory card or the like. The read image data is stored in the color processing parameter holding unit 206.

The average value calculation unit 203 calculates RGB average values of respective patches represented by the read image data (S2), and the color temperature acquisition unit 208 acquires the color temperature of the light source (illumination) upon capturing the read image data (S3).

Figure 4:
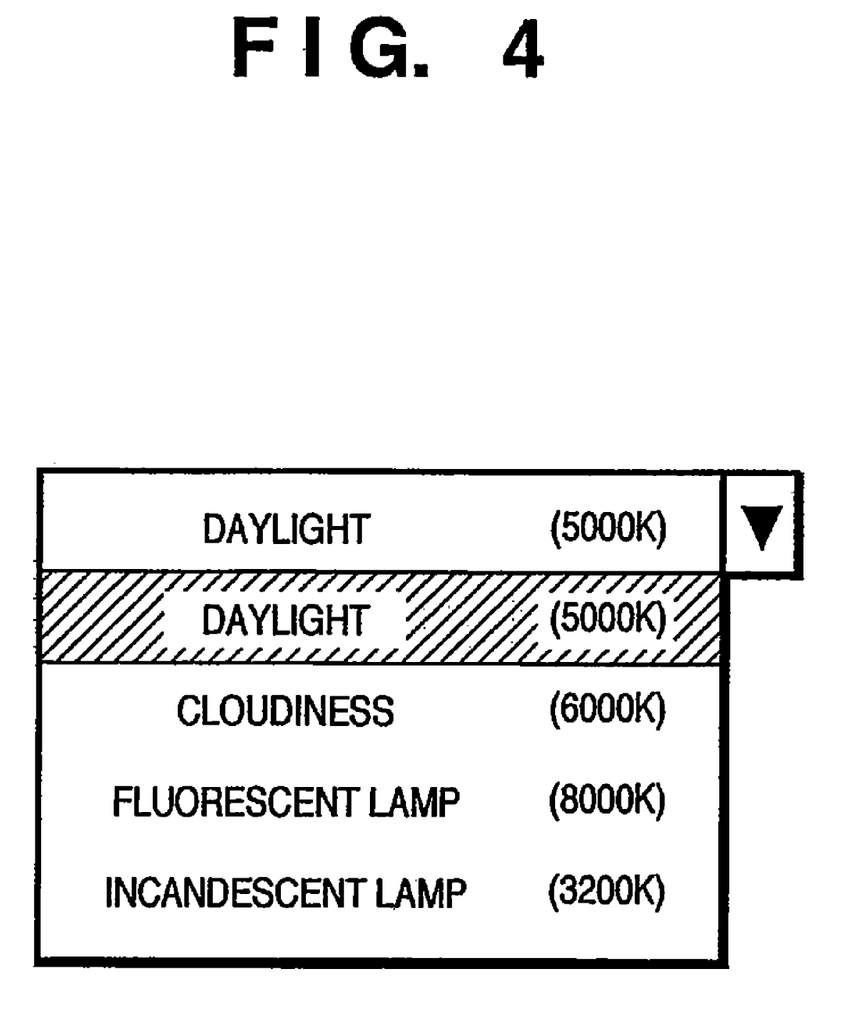
FIG. 4 shows an example of a user interface used to input the color temperature of a light source.

As a method of acquiring the color temperature of the light source (illumination) upon capturing image data, a user interface shown in FIG. 4 may be displayed on the display unit 204 and may prompt the user to select the color temperature. When the color temperatures are displayed, as shown in FIG. 4, the user can easily designate the light source. Alternatively, the color temperature (XYZ values) of a light source upon capturing an image may be measured and input using a chroma meter. Or a reference white plate using $BaSO_4$ (barium sulfate) or the like may be measured using a spectroradiometer under an image capturing light source to input XYZ values. When a measuring instrument is used, it is connected to the data input/output unit 201, and data is input via a user interface displayed on the display unit 204.

When the color temperature of the light source (illumination) is to be acquired via the user interface, color temperatures are displayed on a drop-down menu used to select the name of the light source (illumination), as shown in FIG. 4. The color temperatures whose XYZ values are calculated based on the chromaticity coordinates (xy values) of a perfect radiator specified by JIS to have Y=100 are associated with the names of the light sources.

When the color temperature of the light source (illumination) upon capturing an image can be acquired by a sensor (not shown) mounted on an image capturing device in case of image capturing, the color temperature of the light source upon capturing an image may be acquired from the image capturing device together with image data. In this case, the user need not the color temperature upon capturing an image again.

The image processing unit 202 calculates input data and stores them in the data holding unit 207 (S4). That is, the image processing unit 202 calculates the input data by applying color processing to the previously calculated RGB average values using the color processing parameters set in the color processing parameter holding unit 206. Note that the color processing parameters may use a matrix (e.g., 3×3, 3×9, 3×19, or the like). The RGB data after processing after the processing are assumed to be sRGB data specified by IEC 61966-2-1, and are converted into CIELAB values, thus obtaining the input data.

The image processing unit 202 inputs the target data upon generating the color processing parameters and light source information on which the target data depend, and stores them in the data holding unit 207 (S5). The target data indicate target colors corresponding to the colors of captured image data, which are used upon generating the color processing parameters set in the color processing parameter holding unit 206, and are CIEXYZ values (or CIELab values) obtained by measuring respective patches of the color chart 3 using a measuring instrument. The light source information on which the target data depend is information of a light source of the measuring instrument, i.e., it is color temperature information upon measuring the target data.

The target data and the light source information on which the target data depend can be stored in the data holding unit 207 or an external memory in association with each other. When the target data are CIELab values, they are converted into CIEXYZ values.

When no light source information is appended to the target data, it may be appended based on a user's manual instruction.

The image processing unit 202 converts the CIEXYZ values of the target data into those corresponding to the color temperature of the light source (illumination) upon capturing an image by the Bradford conversion formula using the color temperature of the light source (illumination) upon capturing an image acquired in step S3 and the color temperature (5000K or 6500K are popularly used) upon measuring the target data input in step S5. Since the CIEXYZ values are converted using the color temperature of the light source (illumination) upon capturing an image acquired in step S3, the need for the re-measurement process can be obviated. Furthermore, the CIEXYZ values are converted into CIELAB values, which are stored in the data storage unit 207 (S6). In this embodiment, the Bradford conversion formula is used. Alternatively, another conversion that considers chromatic adaptation such as von Kries conversion may be used.

The parameter edit unit 205 generates color processing parameters (S7). In this processing, let $L^*_i a^*_i b^*_i$ be data obtained by converting the RGB values of respective grids of a 3DLUT, which are assumed to be sRGB values specified by IEC 61966-2-1, into CIELAB values. Also, let $L^*_{Ti} a^*_{Ti} b^*_{Ti}$ be the target data which correspond to the input data and are calculated in step S6. Then, using a DLS method or the like, new color processing parameters are generated by correcting existing color processing parameters (3×3, 3×9, or 3×19 matrix) so that the input data after the color processing become close to the corresponding target data as much as possible.

The newly generated color processing parameters or the source color processing parameters may be saved in association with the color temperature of the light source. In this case, if a new color temperature is input, it is checked if the input color temperature is the same as that associated with the saved color processing parameters. If the two color temperatures are the same, the saved color processing parameters are set as those corresponding to the input color temperature. On the other hand, if the two color temperatures are different, new color processing parameters are generated by the aforementioned processing. That is, if the color temperature of the same light source is input, the corresponding color processing parameters can be used.

Note that the DLS method is an abbreviation for a Damped Least Square method. More specifically, this method is used to calculate processing parameters so that a difference between a data sequence obtained by processing an arbitrary input data sequence using given processing parameters (a matrix in this embodiment) and a corresponding target data sequence becomes close to a target value sequence ($\Delta E$ in this embodiment). As for details of the DLS method, for example, please refer to Yuto Takahashi, "Lens Design", p. 194 Tokai University Press.

For example, color processing parameters which minimize an evaluation function E given by:

$$E = \sum E_i \qquad (1)$$
$$= \sum \sqrt{\{(L^*_{Ti} - L^*_i)^2 + (a^*_{Ti} - a^*_i)^2 + (b^*_{Ti} - b^*_i)^2\}}$$

where $E_i$ is an evaluation function of each patch. are calculated. More specifically, the parameters are updated to decrease the evaluation function.

Alternatively, weighting values may be individually set for respective patches.

$$E = \sum w_i E_i \qquad (2)$$
$$= \sum w_i \sqrt{\{(L^*_{Ti} - L^*_i)^2 + (a^*_{Ti} - a^*_i)^2 + (b^*_{Ti} - b^*_i)^2\}}$$

where $w_i$ is a weighting value of the evaluation function.

Next, the image processing unit 202 generates a 3DLUT using the color processing parameters generated in step S7 (S8). The method of generating a 3DLUT under the assumption that RGB data output from the digital camera 1 are expressed by 10 bits per color (0 to 1023), and the number of slices of the 3DLUT is 17 is as follows.

(R, G, B) = (0, 0, 0)(0, 0, 64)(0, 0, 128) ··· (0, 0, 1023)(0, 64, 0)

(0, 64, 64) ··· (0, 64, 1023)(0, 128, 0)(0, 128, 64) ···

(1023, 1023, 1023)

R'G'B' values calculated by inputting the above 17×17×17=4913 RGB values in turn using the color processing parameters optimized in step S7 are assumed to be sRGB values specified by IEC 61966-2-1 are converted into CIELAB values, thus calculating L*a*b* values. Then, the calculated 4913 pairs of RGB values and L*a*b* values are used as a 3DLUT.

The data input/output unit 201 uploads the generated 3DLUT to the digital camera 1 (S9). The uploaded 3DLUT is used in color processing.

Upon reception of the 3DLUT from the image processing apparatus 2 via the data input/output unit 102, the digital camera 1 stores the received 3DLUT in the holding unit 104. After that, the image processing unit 103 performs image processing (processes of colors, brightness, and the like) using the 3DLUT stored in the holding unit 104. Therefore, accurate color matching can be implemented without re-measuring the target data (i.e., re-measuring the color chart 3) and matching the color temperature of the light source upon capturing an image with that of the light source upon measuring the target data.

The user interface shown in FIG. 4 considers a case wherein the user of the digital camera 1 does not have or cannot use any colorimeter. That is, when the image of the color chart 3 can be captured by the digital camera 1 under the light source (illumination) upon capturing an image, the user can select the color temperature of the light source using the user interface shown in FIG. 4, and can obtain color processing parameters (3DLUT) optimized by the aforementioned processing.

The R'G'B' value calculation method, RGB→CIEXYZ conversion formula, CIEXYZ→CIELAB conversion formula, and Bradford conversion formula in steps S4, S5, S6, S7, and S8 will be described below.

R'G'B' Value Calculation Method

The color processing parameters may use a matrix (e.g., 3×3, 3×9, 3×19, or the like). R'G'B' values are calculated according to the following formulas.

Initially, the input RGB values are normalized. Normalization is attained by dividing each value by $2^{10}-1=1023$ if an input RGB value is expressed by 10 bits per color. Using one of formulas (3) to (5), R'G'B' values are calculated.

$$\begin{bmatrix} R' \\ G' \\ B' \end{bmatrix} = M1 \begin{bmatrix} R \\ G \\ B \end{bmatrix} \qquad (3)$$

$$\begin{bmatrix} R' \\ G' \\ B' \end{bmatrix} = M2 \begin{bmatrix} R \\ G \\ B \\ RR \\ RG \\ RB \\ GG \\ GB \\ BB \end{bmatrix} \qquad (4)$$

$$\begin{bmatrix} R' \\ G' \\ B' \end{bmatrix} = M3 \begin{bmatrix} R \\ G \\ B \\ RR \\ RG \\ RB \\ GG \\ GB \\ BB \\ RRR \\ RRG \\ RRB \\ RGG \\ RGB \\ RBB \\ GGG \\ GGB \\ GBB \\ BBB \end{bmatrix} \quad (5)$$

where M1 is a 3×3 matrix, M2 is a 3×9 matrix, and M3 is a 3×19 matrix.

sRGB→CIEXYZ Conversion $R_{liner} = R_{sRGB}/12.92$ when $R_{sRGB} \leq 0.04045$ $R_{liner} = \{(R_{sRGB}+0.055)/1.055\}^{2.4}$ when $R_{sRGB} > 0.04045$ (6)

$G_{liner} = G_{sRGB}/12.92$ when $G_{sRGB} \leq 0.04045$ $G_{liner} = \{(G_{sRGB}+0.055)/1.055\}^{2.4}$ when $G_{sRGB} > 0.04045$ (7)

$B_{liner} = B_{sRGB}/12.92$ when $B_{sRGB} \leq 0.04045$ $B_{liner} = \{(B_{sRGB}+0.055)/1.055\}^{2.4}$ when $B_{BsRCB} > 0.04045$ (8)

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{liner} \\ G_{liner} \\ B_{liner} \end{bmatrix} \times 100.0 \quad (9)$$

$X = X \cdot Xn/95.045$ $Y = Y \cdot Yn/100.000$ $Z = Z \cdot Zn/108.892$ (10)

where Xn, Yn, and Zn are values calculated from the color temperature of illumination upon capturing an image.

CIEXYZ→CIELAB Conversion $X_{Rate} = (X/Xn)^{1/3}$ when $X/Xn > 0.00856$ $X_{Rate} = 7.787 \times (X/Xn) + 16.0/116.0$ when $X/Xn \leq 0.00856$ (11)

$Y_{Rate} = (Y/Yn)^{1/3}$ when $Y/Yn > 0.00856$ $Y_{Rate} = 7.787 \times (Y/Yn) + 16.0/116.0$ when $Y/Yn \leq 0.00856$ (12)

$Z_{Rate} = (Z/Zn)^{1/3}$ when $Z/Zn > 0.00856$ $Z_{Rate} = 7.787 \times (Z/Zn) + 16.0/116.0$ when $Z/Zn \leq 0.00856$ (13)

$L^* = 116.0 \times (Y/Yn)^{1/3} - 16.0$ when $Y/Yn > 0.00856$ $L^* = 903.29 \times (Y/Yn)$ when $Y/Yn \leq 0.00856$ (14)

$a^* = 500 \times (X_{rate} - Y_{rate})$ $b^* = 200 \times (Y_{rate} - Z_{rate})$ (15)

where Xn, Yn, and Zn are values calculated from the color temperature of illumination upon capturing an image.

Bradford Conversion Formula (16)

$$M1 = \begin{bmatrix} 0.8951 & 0.2664 & -0.1614 \\ -0.7502 & 1.7135 & 0.0367 \\ 0.0389 & -0.0685 & 1.0296 \end{bmatrix}$$

$$\begin{bmatrix} P2x \\ P2y \\ P2z \end{bmatrix} = M1 \begin{bmatrix} Xsrc \\ Ysrc \\ Zsrc \end{bmatrix} \quad (17)$$

$$\begin{bmatrix} P3x \\ P3y \\ P3z \end{bmatrix} = M1 \begin{bmatrix} Xdst \\ Ydst \\ Zdst \end{bmatrix} \quad (18)$$

$$M2 = \begin{bmatrix} P3x/P2x & 0 & 0 \\ 0 & P3y/P2y & 0 \\ 0 & 0 & P3z/P2z \end{bmatrix} \quad (19)$$

$$\begin{bmatrix} Xout \\ Yout \\ Zout \end{bmatrix} = M1^{-1} \cdot M2 \cdot M1 \begin{bmatrix} Xin \\ Yin \\ Zin \end{bmatrix} \quad (20)$$

where Xsrc, Ysrc, and Zsrc are values calculated from the condition upon colorimetry, Xdst, Ydst, and Zdst are values calculated from the color temperature of illumination upon capturing an image, Xin, Yin, and Zin are CIEXYZ values before conversion, and Xout, Yout, Zout are CIEXYZ values after conversion.

[Modification Example]

The digital camera 1 and image processing apparatus 2 exchange data via a cable. Of course, they may exchange data using a recording medium such as a memory card or the like, or a communication channel such as radio, infrared rays, or the like.

In the above embodiment, formula (1) or (2) are used as the evaluation function. Alternatively, ΔE94 which is expressed by:

$$E_i = \Delta E_{94} \quad (21)$$
$$= \sqrt{\left[\Delta L^{*2} + \{\Delta C^*/(1+0.045C_1)\}^2 + \{\Delta H^*/(1+0.015C_1)\}^2\right]}$$

$$E_i = W_i \Delta E_{94} \quad (22)$$
$$= W_i \sqrt{\left[\Delta L^{*2} + \{\Delta C^*/(1+0.045C_1)\}^2 + \{\Delta H^*/(1+0.015C_1)\}^2\right]}$$

where $\Delta L^* = L^*_{Ti} - L^*_i$
$\Delta C^* = \sqrt{(a^{*2}_{Ti} + b^{*2}_{Ti})} - \sqrt{(a^{*2}_i + b^{*2}_i)}$
$\Delta H^* = \sqrt{(\Delta E^2 + \Delta L^{*2} + \Delta C^{*2})}$
$C_1 = \sqrt{(a^{*2}_{Ti} + b^{*2}_{Ti})}$
$W_i$ is the weighting value of each patch The program code of software required to implement the functions of the image processing apparatus 2 is supplied to a computer in an apparatus or system which is connected to various devices and controls to operate these devices. The computer (CPU or MPU) of the system or apparatus controls to operate the various devices in accordance with the supplied program to carry out the above embodiment. Such case is also included in the scope of the present invention. For example, the scope of the present invention includes a case wherein the aforementioned image processing is implemented on driver software installed in the computer. In this case, the program code itself of the software implements the functions of the aforementioned embodiment, and the program code itself and a storage medium which is used to supply the program code to the computer and stores that program code constitute the present invention.

In the above example, the color temperature of the light source (illumination) is used as light source information. However, the present invention is not limited to the color temperature, but other kinds of light source information may be used. For example, information which can be used to generate the conversion conditions used in step S6 such as values (Xsrc, Ysrc, Zsrc), (Xdst, Ydst, Zdst), and the like may be used.

In the above example, colorimetry values measured by a colorimeter are used as the target data. Alternatively, the acquired colorimetry values may be edited based on a user's instruction, and the edited colorimetry values may be used as the target data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-071738, filed on Mar. 14, 2005 which is hereby incorporated by reference herein in its entirety.

What is claimed is:

1. A color processing method comprising:

acquiring color data which is obtained by capturing an image of a color chart by an image capturing apparatus under a first light source, and depends on the first light source;

acquiring target data which is based on colorimetry data of the color chart under a second light source, and depends on the second light source;

converting the target data which depends on the second light source into target data which depends on the first light source; and generating a color processing parameter corresponding to the first light source based on the color data which depends on the first light source and the target data which depends on the first light source.

2. The method according to claim 1, further comprising:

adjusting the target data which depends on the second light source in accordance with a users instruction.

3. The method according to claim 1, further comprising:

setting a conversion condition used in the conversion based on first light source information corresponding to the first light source and second light source information corresponding to the second light source.

4. The method according to claim 3, wherein the conversion condition is the Bradford conversion formula.

5. The method according to claim 3, further comprising:

setting the first light source information or/and the second light source information based on a user's manual instruction.

6. The method according to claim 3, wherein the first light source information is acquired upon capturing the image of the color chart byte image capturing apparatus under the first light source.

7. The method according to claim 1, further comprising:
acquiring color data which is obtained by capturing an image of the color chart by an image capturing apparatus under a third light source, and depends on the third light source;
managing the generated color processing parameter in association with first light source information corresponding to the first light source; and
applying, when light source information corresponding to the third light source is equal to the managed first light source information, color processing to the color data which depends on the third light source using the managed color processing parameter.

8. The method according to claim 1, wherein generating the color processing parameter includes optimizing a parameter based on a color difference between color data obtained by convening the color data which depends on the first light source using a predetermined color processing parameter, and the target data which depends on the first light source.

9. The method according to claim 1, further comprising:
generating a lookup table based on the generated color processing parameter; and
applying color processing to the color data which depends on the first light source using the lookup table.

10. A program on a computer readable memory medium for making a computer execute color processing, said program characterized by making the computer execute:
acquiring color data which is obtained by capturing an image of a color chart by an image capturing apparatus under a first light source, and depends on the first light source;
acquiring target data which is based on colorimetry data of the color chart under a second light source, and depends on the second light source;
converting the target data which depends on the second light source into target data which depends on the first light source; and
generating a color processing parameter corresponding to the first light source based on the color data which depends on the first light source and the target data which depends on the first light source.

11. A color processing apparatus comprising:

first acquisition means for acquiring color data which is obtained by capturing an image of a color chart by an image capturing apparatus under a first light source, arid depends on the first light source;

second acquisition means for acquiring target data which is based on colorimetry data of the color chart under a second light source, and depends on the second light source;

conversion means for converting the target data which depends on the second light source into target data which depends on the first light source; and generation means for generating a color processing parameter corresponding to the first light source based on the color data which depends on the first light source and the target data which depends on the first light source.

* * * * *